Oct. 25, 1927.  M. J. LEAHY  1,646,754
PUMP, COMPRESSOR, OR THE LIKE
Filed Feb. 14, 1927
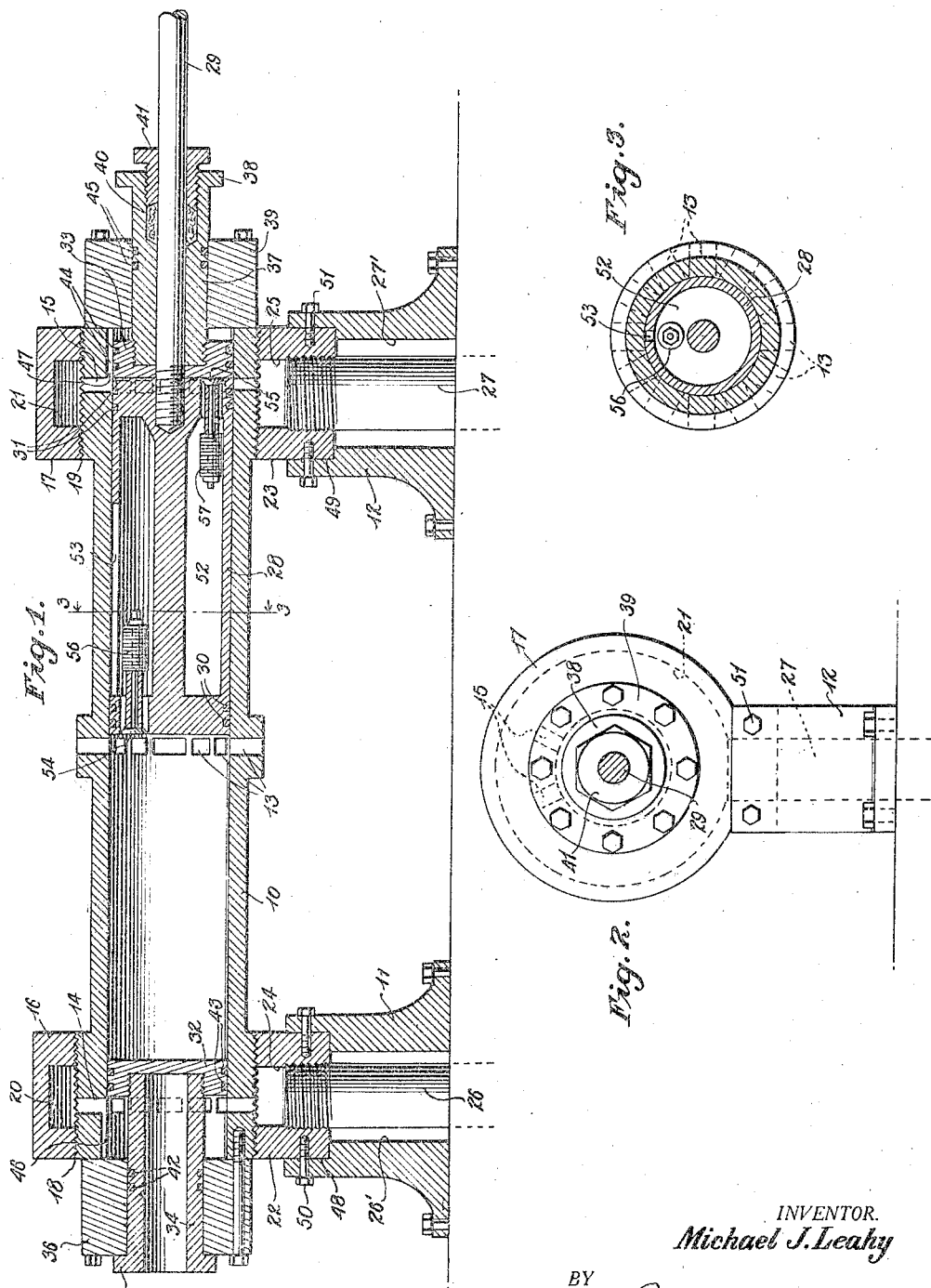
INVENTOR.
Michael J. Leahy
BY
Brower & Phelps
ATTORNEYS Patented Oct. 25, 1927.

1,646,754

UNITED STATES PATENT OFFICE.

MICHAEL J. LEAHY, OF TUCSON, ARIZONA.

PUMP, COMPRESSOR, OR THE LIKE.

Application filed February 14, 1927. Serial No. 168,230.

The invention relates to pumps, compressors, or the like and has as an object the provision of a device of this character wherein no clearance is left within the compression chamber when the compressed gas or the material being pumped is finally delivered to the outlet.

A further object of the invention is the provision of a device of the character referred to without the use of poppet valves to prevent the back flow of the material acted upon.

A further object of the invention is the provision of a device of this character having means to release material which escapes past the packing rings of the piston.

Further objects of the invention will appear from the following description when read in connection with the accompanying drawings showing an illustrative embodiment of the invention and wherein:

Fig. 1 is a central vertical section;

Fig. 2 is an end view seen from the right of Fig. 1; and

Fig. 3 is a vertical section on line 3—3 of Fig. 1.

As shown, the device comprises a cylinder 10 and supporting footings 11, 12. The cylinder 10 is shown as provided with inlet ports 13 preferably arranged radially about the center of the cylinder. Outlet ports are shown at 14 and 15 preferably arranged radially adjacent the ends of the cylinder. To conduct material acted upon by the device, the ports 14 and 15 are shown as enclosed by sleeves 16, 17, having screwthreaded engagement at 18, 19 with the wall of the cylinder, each sleeve formed with an annular channel 20, 21. Each annular sleeve is shown as formed with a cylindrical projecting portion 22, 23, each having screwthreaded engagement with a conduit 26, 27, passing through passages 26', 27', provided in the feet 11, 12, which conduits are in communication by means of conduits not shown with the receptacle or other space to which the pump is adapted to deliver.

To compress material flowing through the inlet portion 13 or to force the same out of the outlets 14, 15, in the case of a liquid pump, there is shown a piston 28 in the cylinder and it may be caused to reciprocate therein by means of a piston rod 29. The piston is shown, adjacent each end thereof, as provided with packing rings 30, 31.

To control the outlet ports 14, 15, there are shown sliding valves 32, 33. The valve 32 is shown as having screwthreaded engagement with a cylinder 34 provided with a flange 35 adapted to contact with a head 36 of the cylinder and the valve 33 is shown as having screwthreaded engagement with a cylindrical sleeve 37 having a flange 38 adapted to contact with a head 39 of the cylinder.

The piston rod 29 is shown as passing through the cylinder 37 and reciprocating therein, a stuffing gland 40 compressed by a sleeve 41 being provided to prevent leakage about the piston rod.

Packing rings are shown at 42 upon the sleeve 34, at 43 in the valve 32, at 44 in the valve 33, and at 45 in the sleeve 37.

To permit access of the material under compression or of the material being forced by the pump to the rear of valve 32, 33 to retain these valves in their position of cutting off the outlet ports 14, 15, there are shown channels 46, 47 in the wall of the cylinder adjacent the heads 36, 39 thereof. The cylindrical portions 22, 23, are shown as seating in recesses 48, 49, in the feet 11, 12, and may be retained therein as by means of cap screws 50, 51.

Some leakage of material acted upon by the piston 28 is bound to occur past the rings 30, 31. To provide escape for such material, the piston is shown as formed with a chamber 52 communicating with the outer surface of the piston as by means of a slot 53. To permit the escape of material from the chamber 52, poppet valves 54, 55 are shown seating in ports in the opposite sides of piston 28 and retained against their seats by springs 56, 57.

In operation, with the piston in the position shown in Fig. 1, gas to be compressed or liquid in which the pump is immersed will enter through the ports 13 which ports will be cut off by reciprocation of the piston to the left in Fig. 1 and will be compressed in the thus closed chamber of the cylinder. When the pressure in this chamber rises to a point in excess of the pressure in the conduit 26, the valve 32 will be forced to the left upon continued movement of piston 28, whereupon the ports 15 will be opened, allowing the material under compression to escape into the conduit 26. At the end of the stroke to the left of the piston, the piston will be in contact with valve 32 with no clearance, thereby forcing the entire body of compressed material through the ports 14 and at this point the piston 28 will have opened the inlet ports 13 into the chamber then to the right of piston 28.

The return of piston 28 by virtue of the introduction of material under compression behind the valve 32 will result in the retaining of the contact between the face of piston 28 and the valve 32 until the flange 35 comes into the contact with the head 36 when the ports 14 will be entirely closed from access to the chamber of the pump. The action of the valve 33 will be similar to that of valve 32 when the piston is in the opposite end of cylinder from that shown.

It will be seen that the presence of channel 46 is not necessary to the action of valves 32, 33, when the device is being utilized to compress gas since the portion of the cylinder in the rear of valves 32, 33 will be at all times in communication with the outlet ports when the pistons are in their cut-off position and when forced to the valve opening position by contact with the piston, the gas under pressure in the rear of the valves will, in the absence of such channels 46, or 47, be compressed to a greater degree and by their elasticity will return the valves to a position to again give access of the outlet ports to the space in the rear thereof when the piston returns.

Any pressure in the chamber 52 will during the resultant rarefaction of the movement of the piston to the left in Fig. 1 escape through the valve 55 and such escape will take place through the valve 54 when the piston is moving to the right.

It will be understood that in the use of the device in pumping liquids in which the pump is not immersed, a sleeve similar to the sleeve 16, 17 may be provided surrounding the inlet ports 13 and the material to be pumped may be led to the ports 13 through such sleeve.

Minor changes may be made in the physical embodiment of the invention within the scope of the appended claims without departing from its spirit.

I claim:

1. A pump, compressor, or the like, comprising, in combination, a cylinder having inlet ports adjacent the central portion and outlet ports in its periphery adjacent the ends thereof, a piston reciprocating in said cylinder adapted to open and close said inlet ports during its reciprocation, valves sliding in said cylinder adapted during their reciprocation to open and close said outlet ports, heads for said cylinder, means connected to said valves sliding in said heads and carrying stop means co-acting with stop means carried by said heads to limit the inward motion of said valves and means in communication with said ports to give access of material under pressure to the rear of said valves to urge the same to position to close said ports.

2. A pump, compressor, or the like, comprising, in combination, a cylinder having outlet ports in its periphery adjacent an end thereof and an inlet port, a piston reciprocating in said cylinder to compress material admitted through said inlet port, a valve mounted for reciprocation in said cylinder, a head upon said cylinder having a passage therethrough, means connected to said valve slidably mounted in said passage to guide reciprocations of said valve, means carried by said sliding means to limit the inward motion of said valve to a position to close said inlet ports from communication with the compression space of the cylinder, said inlet ports normally opening into the space in the rear of said valve.

3. A pump, compressor, or the like, comprising, in combination, a cylinder having outlet ports in its periphery adjacent an end thereof and an inlet port, a piston reciprocating in said cylinder, a valve mounted for reciprocation in said cylinder normally closing access of said outlet ports to the compression space of the cylinder, said valve forced to a position to open said outlet ports upon compression of the material in the cylinder by reciprocation of said piston, a head carried by said cylinder having a passage therethrough, a sleeve slidably mounted in said passage and connected to said head to guide reciprocation thereof, a flange carried by said sleeve normally contacting with the exterior of said head to limit inward movement of said valve said valve urged to port-closing position by pressure of material acted upon by said piston, upon the rear of the valve.

4. A pump, compressor, or the like, comprising, in combination, a cylinder having outlet ports in its periphery adjacent an end thereof and an inlet port, a piston reciprocating in said cylinder, a valve mounted for reciprocation in said cylinder normally closing access of said outlet ports to the compression space of the cylinder, said valve forced to a position to open said outlet ports upon compression of the material in the cylinder by reciprocation of said piston, a head carried by said cylinder having a passage therethrough, a sleeve slidably mounted in said passage and connected to said head to guide reciprocation thereof, a flange carried by said sleeve normally contacting with the exterior of said head to limit inward movement of said valve, said valve urged to port-closing position by pressure of material acted upon by said piston upon the rear of the valve, said valve having an opening therethrough in alignment with the interior of said sleeve, a piston rod connected to said piston and reciprocating in said sleeve passage and said opening.

5. A pump, compressor, or the like, comprising, in combination, a cylinder having outlet ports in its periphery adjacent the end thereof and an inlet port, a collar surrounding said outlet ports having an annular passage in communication therewith and having an outlet passage, a support for said cylinder having a passage therethrough and a recess adapted to receive the walls of said outlet passage, a conduit in communication with said outlet passage passing through said support, a piston reciprocating in said cylinder, a valve mounted for reciprocation in said cylinder normally standing in position to close said outlet ports, said valve forced to port-closing position by pressure of material in said channel acting upon the rear of said valve and means to limit the inward movement of said valve.

6. A pump, compressor, or the like, comprising, in combination, a cylinder having inlet and outlet ports and a piston reciprocating therein, said piston adapted to close said inlet ports in its reciprocation, packing rings carried by said piston, means opening through a face of the piston to permit escape of compressed material leaking past said rings to the compression space of said cylinder.

7. A pump, compressor, or the like, comprising, in combination, a cylinder having inlet and outlet ports and a piston reciprocating therein, said piston adapted to close said inlet ports in its reciprocation, packing rings carried by said piston, said piston having a chamber, means to admit material passing said rings to said chamber, said piston having an outlet port in its compression face, a poppet valve spring-pressed to said seat to permit escape of material under pressure from said chamber.

MICHAEL J. LEAHY.